United States Patent [19]
Fujimoto et al.

[11] Patent Number: 5,508,501
[45] Date of Patent: Apr. 16, 1996

[54] IC CARD PROCESSING APPARATUS HAVING FUNCTION FOR CERTAINLY RECEIVING PROPER CARDS AND DISCHARGING WRONG CARDS

[75] Inventors: Osamu Fujimoto, Machida; Yutaka Yoshino, Odawara, both of Japan

[73] Assignee: Anritsu Corporation, Tokyo, Japan

[21] Appl. No.: 310,661

[22] Filed: Sep. 22, 1994

[30] Foreign Application Priority Data

Dec. 16, 1993 [JP] Japan ...................................... 5-343570

[51] Int. Cl.⁶ ........................................................ G06K 7/06
[52] U.S. Cl. .......................... 235/441; 235/483; 235/486; 235/492
[58] Field of Search ...................................... 235/441, 483, 235/486, 492

[56] References Cited

U.S. PATENT DOCUMENTS 4,873,425  10/1989  Langlais et al. .
5,012,078   4/1991  Pernet .
5,202,551   4/1993  Parrer ..................................... 235/441

Primary Examiner—Harold Pitts
Attorney, Agent, or Firm—Frishauf, Holtz, Goodman, Langer & Chick

[57] ABSTRACT

In order to certainly receive a proper IC card having a regular length to a terminal contact position without causing a forcible force to act on an integrated circuit incorporated in the IC card to discharge a wrong card having a length smaller than the regular length, an IC card inserted from a card insertion port is advanced toward a card storage unit of a frame having an opening formed in the lower surface thereof while the IC card is slightly pressed downward, and the leading end of the IC card is brought into contact with a card receiver of a slide member. The slide member is biased by a spring toward the card insertion port and is slid backward when the IC card is pressed deeper with a force stronger than the biasing force of the spring. A pivoting member in contact with a cam portion of the slide member is pivoted toward the card storage unit, and the IC card is pressed from a lower direction thereof to the contact terminal direction, thereby bringing the external terminals of the IC card into contact with the contact terminals, respectively. For this reason, the wrong card having a length smaller than the regular is discharged from the largely opened lower surface of the card storage unit.

8 Claims, 11 Drawing Sheets

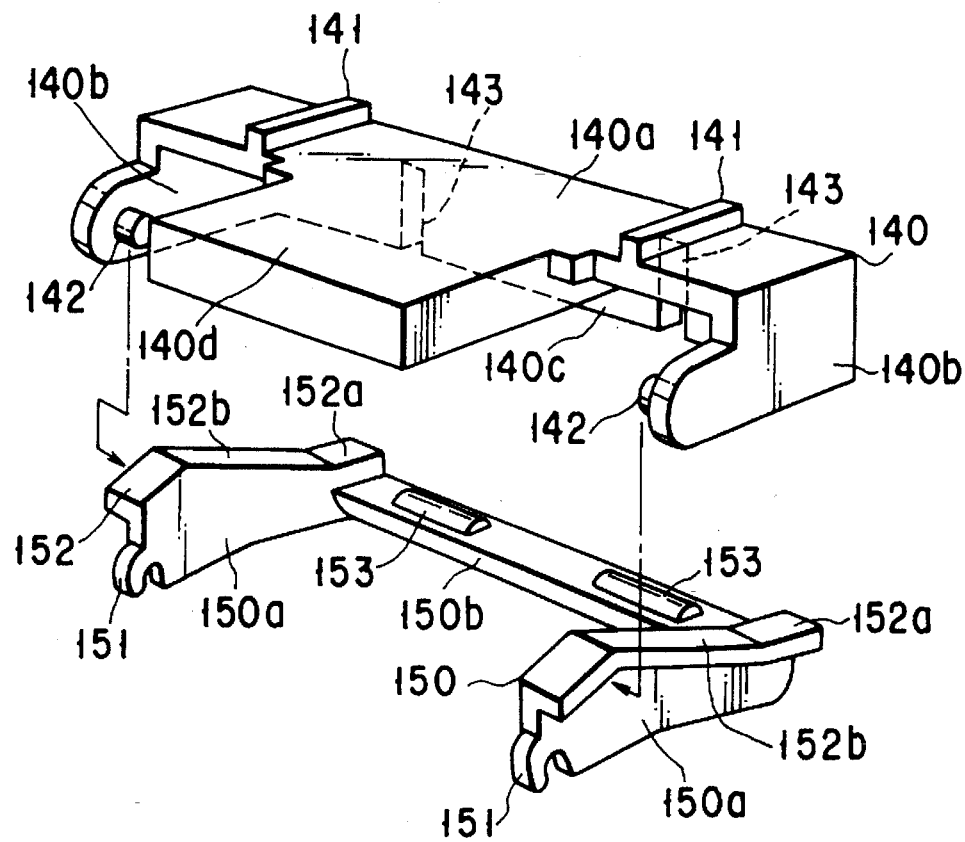
F I G. 15
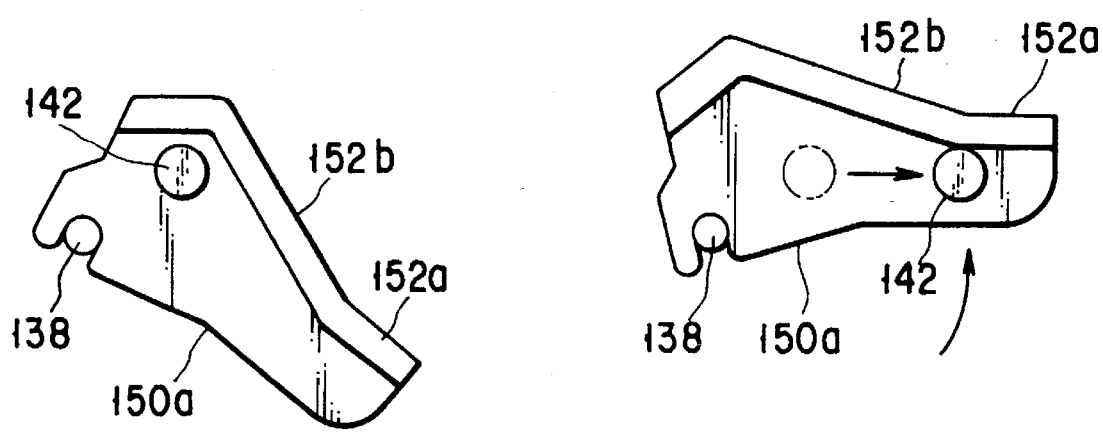
F I G. 16A
F I G. 16B

IC CARD PROCESSING APPARATUS HAVING FUNCTION FOR CERTAINLY RECEIVING PROPER CARDS AND DISCHARGING WRONG CARDS

BACKGROUND OF THE INVENTION

1. Field of the Invention

The present invention generally relates to an IC card processing apparatus and, more particularly, to an IC card processing apparatus having a function for receiving only a proper IC card incorporating a memory circuit or the like and having a regular length, performing a read/write process to the IC card, and discharging a wrong card having a length larger or smaller than the regular length without receiving the wrong card.

2. Description of the Related Art

As is well known, an IC card, unlike a magnetic recording card, electrically stores various kinds of information in a memory IC, and is formed such that the information is exchanged between the IC card and an IC card processing apparatus serving as an external apparatus connected to the card through terminals arranged on the outer surface portion of the card.

FIG. 21 shows an example of an IC card 1. A plurality of external terminals 2 are respectively arranged at predetermined positions near the leading end on one surface 1a of the card 1 consisting of a resin, and the external terminals are connected to a memory IC (not shown) incorporated near the terminals of the IC card.

When the IC card 1 does not electrically exchange predetermined information with the IC card processing apparatus through the external terminals 2, information unique to a card holder, transaction information, or the like cannot be recognized. For this reason, the IC card is not illegally used easier than a magnetic card, and the contents of the IC card are not changed by an external magnetic force. Therefore, IC cards have been used in place of magnetic cards.

An IC card processing apparatus for reading/writing information from/in such an IC card does not generally have a receiving mechanism therein, and is arranged as follows. That is, the IC card processing apparatus receives an IC card inserted from a card insertion port until the external terminal portion of the IC card is inserted into the apparatus, and contact terminals are brought into contact with the external terminals of the card in the apparatus, respectively, thereby receiving and transmitting information through the contact terminals. Thereafter, the IC card from/in which information has been read/written is manually removed and used.

However, in such a conventional IC card processing apparatus, when a wrong card cut shorter than a proper card to intend misuse is completely inserted from a card insertion port into the apparatus, this wrong card cannot be removed from the outside, resulting in inconvenience. Therefore, the apparatus cannot be used thereafter.

As a technique for solving the above problem, an IC card processing apparatus 10 shown in FIG. 22 is disclosed in U.S. Pat. No. 4,873,425. That is, in the IC card processing apparatus 10, an IC card 1 received from a card insertion port 11 is inserted into a housing 12 having an opening formed in the lower surface thereof, the leading end of the card passing above the opening is guided upward by an inclined guide member 13, and external terminals 2 of the card are brought into contact with a plurality of opposing contact terminals 14 arranged on the upper portion of the guide member 13, respectively.

According to this technique, as shown in FIG. 23, when a wrong card 3 having a length smaller than that of a proper card is inserted from the card insertion port 11 of the IC card processing apparatus, and the trailing end of the card passes through the card insertion port 11, the wrong card 3 is moved downward from the opening along the guide member 13 to be discharged out of the apparatus. In addition, when a wrong card having a length larger than that of the proper card is inserted, although the wrong card is temporarily stopped in the apparatus, the wrong card is discharged out of the apparatus from the opening when the wrong card is pressed by a subsequent card inserted by a next user to cause the trailing end of the wrong card to pass through the card insertion port 11.

However, in the conventional IC card processing apparatus as described above, since the external terminals are brought into contact with the contact terminals, respectively, such that the card itself is strongly bent at a position between the leading end and intermediate portion of the IC card 1, the strong deformation force acts on an integrated circuit such as a memory IC buried near the external terminals of the IC card, and the integrated circuit in the IC card may be damaged.

In order to avoid this, for example, the inclination angle of the guide member 13 in the IC card processing apparatus shown in FIG. 23 is decreased, the opening for discharging a wrong card decreases in size, and wrong cards except for cards each having a very small length cannot be discharged out of the apparatus. In addition, when the lower portion of the guide member 13 is decreased in length to increase the opening in size while the inclination angle of the guide member 13 is kept small, a proper card inserted such that the leading end is kept lowered cannot be received by the guide member 13, and the proper card is discharged from the opening, thereby resulting in inconvenience to the user.

As described above, in a conventional IC card, not only wrong cards each having a length smaller than a regular length but also wrong cards each having a length larger than the regular length cannot be easily discharged out of the apparatus without causing a forcible deformation force to act on the IC cards, and proper IC cards cannot be easily certainly guided to a terminal contact position.

SUMMARY OF THE INVENTION

It is, therefore, an object of the present invention to provide a new and improved IC card processing apparatus for certainly receiving proper cards and discharging wrong cards in which not only wrong cards each having a length smaller than a regular length but also wrong cards each having a length larger than the regular length can be discharged out of the apparatus without causing a forcible deformation force to act on the IC cards, and proper IC cards can be certainly guided to a terminal contact position.

More specifically, it is an object of the present invention to provide an IC card processing apparatus which solves the problem of the prior art.

According to the present invention, there is provided an IC card processing apparatus, which is designed to receive an IC card having a predetermined size and external terminals on one surface of the IC card and has contact terminals, for bringing the external terminals into contact with the contact terminals to perform a read/write process, comprising: a slot having a card insertion port for receiving the IC card; a frame, having an opening for, when a card-like foreign substance having a size smaller than the predetermined size is inserted from the card insertion port, discharging the card-like foreign substance, for receiving the IC card inserted from the card insertion port of the slot; a movable member movably attached to the frame to be pressed and moved by the IC card inserted from the slot; and a card pressing member, engaged with the movable member and pivoted with movement of the movable member, for pressing the other surface of the IC card when the IC card is inserted to a predetermined position in the frame to bring the external terminals into contact with the contact terminal and to keep the IC card at the predetermined position.

Additional objects and advantages of the invention will be set forth in the description which follows, and in part will be obvious form the description, or may be learned by practice of the invention. The objects and advantages of the invention may be realized and obtained by means of the instrumentalities and combinations particularly pointed out in the appended/claims.

BRIEF DESCRIPTION OF THE DRAWINGS

The accompanying drawings which are incorporated in and constitute a part of the specification, illustrate presently preferred embodiments of the invention and, together with the general description given above and the detailed description of the preferred embodiments given below, serve to explain the principles of the invention.

FIG. 15 is an exploded perspective view showing the main part of the IC card processing apparatus of the second embodiment;

FIGS. 16A and 16B schematic views for explaining the operation of a card pressing member with respect to the sliding operation of a slide member in the IC card processing apparatus of the second embodiment;

DETAILED DESCRIPTION OF THE PREFERRED EMBODIMENTS

Figure 1:
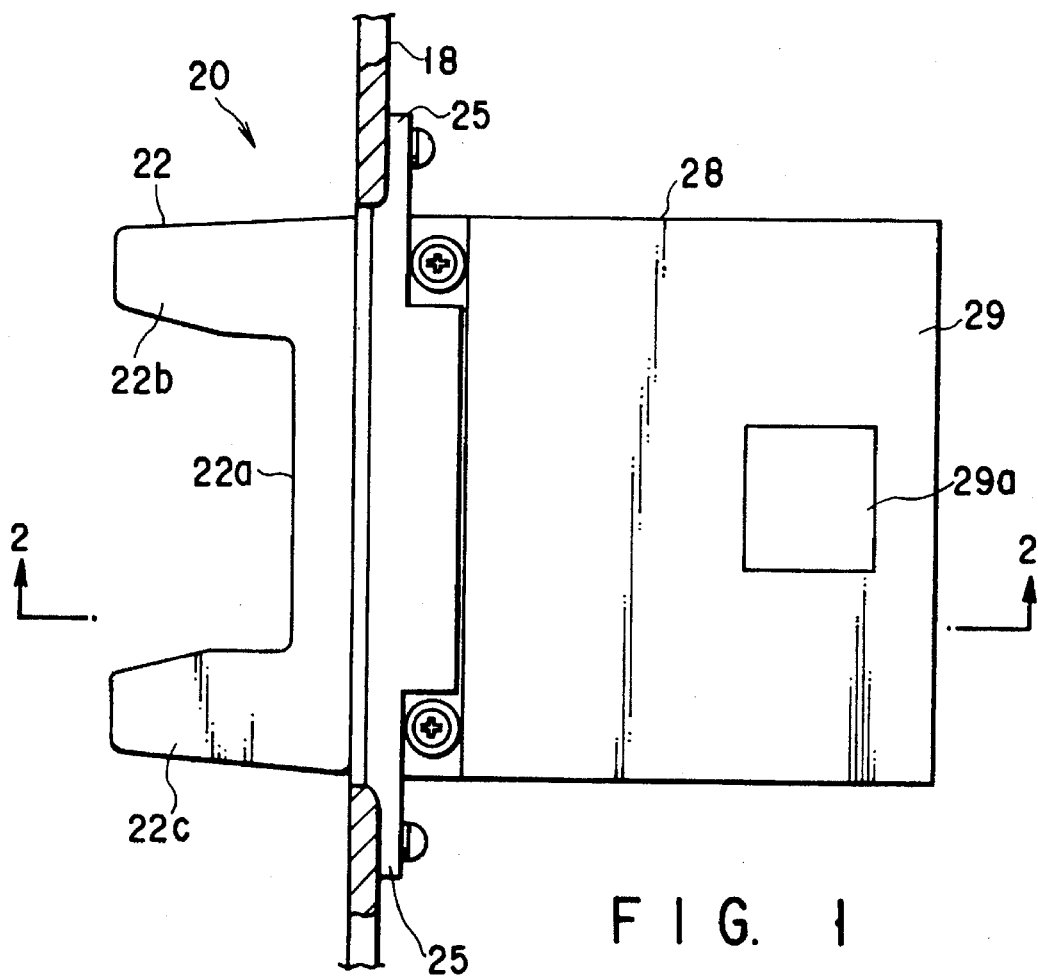
FIG. 1 is a plan view showing an IC card processing apparatus according to the first embodiment of the present invention.
Figure 2:
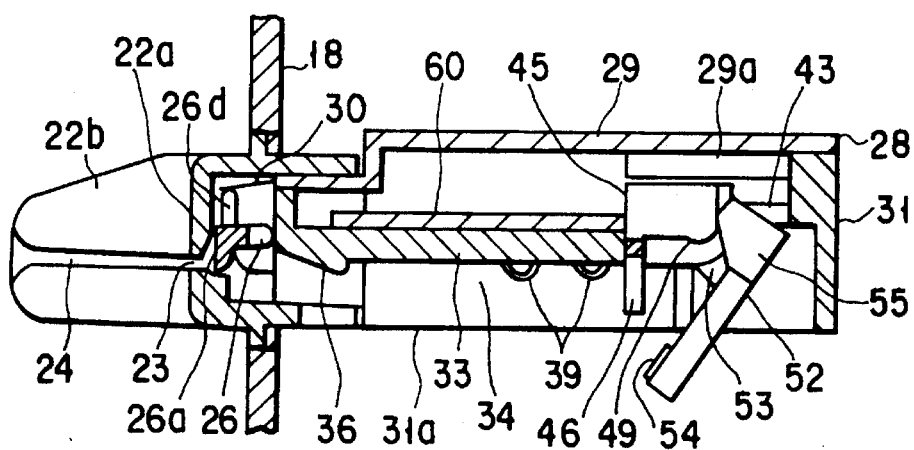
FIG. 2 is a sectional view showing the IC card processing apparatus along a line 2—2 in FIG. 1.
Figure 3:
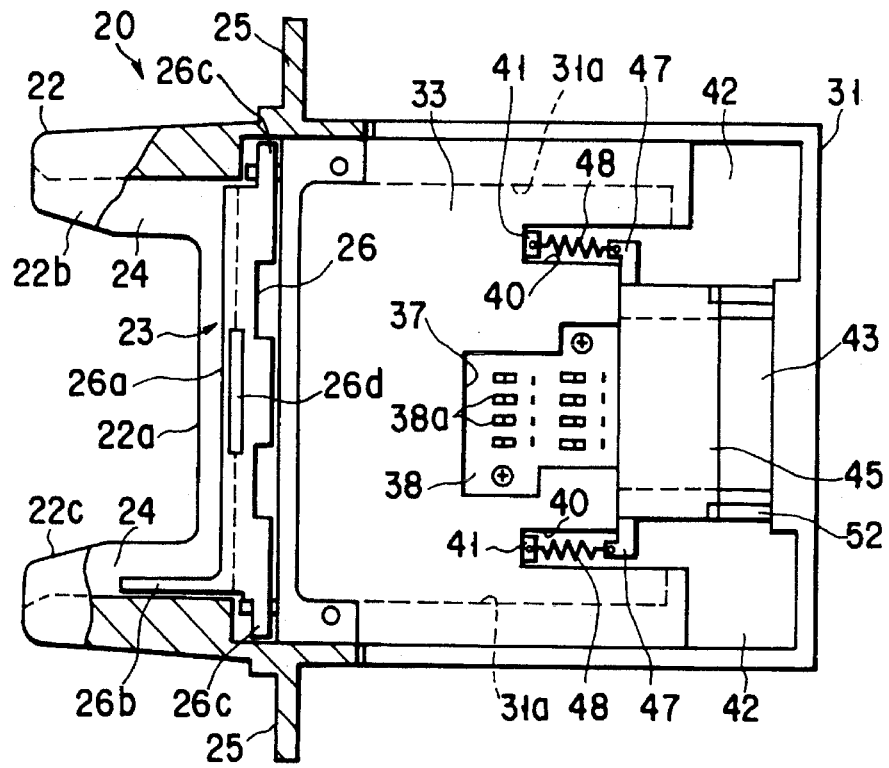
FIG. 3 is a plan view showing the IC card processing apparatus of the first embodiment in which a cover and a circuit board are not illustrated.
Figure 4:
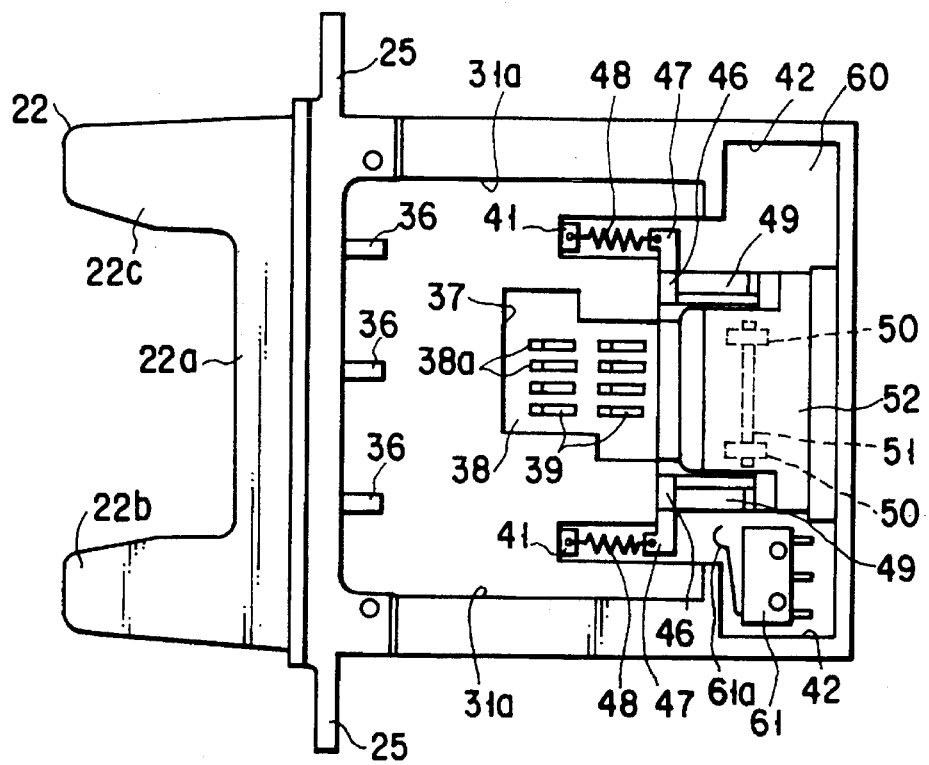
FIG. 4 is a bottom view showing the IC card processing apparatus of the first embodiment.

Reference will now be made in detail to the presently preferred embodiments of the invention as illustrated in the accompanying drawings, in which like reference characters designate like or corresponding parts throughout the several drawings.

The first embodiment will be briefly described below. In order to solve the above problems, an IC card processing apparatus according to the first embodiment of the present invention comprises a slot having a card insertion port for receiving the IC card, a frame, having an opening for, when a card-like foreign substance having a size smaller than the predetermined size is inserted from the card insertion port, discharging the card-like foreign substance, for receiving the IC card inserted from the card insertion port of the slot, a movable member movably attached to the frame to be pressed and moved by the IC card inserted from the slot, and a card pressing member, engaged with the movable member and pivoted with movement of the movable member, for pressing the other surface of the IC card when the IC card is inserted to a predetermined position in the frame to bring the external terminals into contact with the contact terminal and to keep the IC card at the predetermined position.

Since the IC card processing apparatus is arranged as described above, in the IC card processing apparatus according to the first embodiment of the present invention, when an IC card is inserted from the card insertion port into the card storage unit, the slide member in the frame is slid deep by the leading end of the IC card. The card pressing member pressed by the slide member is pivoted to press the IC card from the lower surface side to the contact terminal side, thereby bringing the external terminals of the card into contact with the contact terminals, respectively.

The first embodiment of the present invention will be described below with reference to the accompanying drawings.

FIGS. 1 to 6 show an IC card processing apparatus 20 according to the first embodiment of the present invention.

This IC card processing apparatus 20 is arranged in, e.g., a housing 18 of a public telephone set which can be used by a user with a prepaid IC card. An IC card 1 manually inserted by the user is received to a position where the IC card 1 can be removed after the public telephone set is used, and call rate information recorded on the IC card is updated.

The IC card processing apparatus 20 is constituted by a metal card slot 22 fixed to project from the housing 18 to receive the IC card 1 from the outside and a resin housing 28 fixed to the rear portion of the card slot 22.

The card slot 22 is constituted by a base portion 22a having a card insertion port 23 formed on the front surface side thereof and opposing projecting portions 22b and 22c projecting forward from both the sides of the base portion 22a. The card slot 22 is formed to have an almost U shape when viewed from the upper direction. The interval between the opposing surfaces of the two projecting portions 22b and 22c is set to be smaller than the width of the IC card. Guide grooves 24, communicating with the card insertion port 23, for horizontally guiding the IC card 1 inserted from the user side are arranged on the opposing surfaces of the projecting portions 22b and 22c, respectively.

Flanges 25 are arranged on both the sides of the card slot 22. Since the flanges 25 are mounted on the inner surface side of the housing 18 with screws or the like, the IC card processing apparatus 20 is entirely supported by the housing 18.

Figure 5:
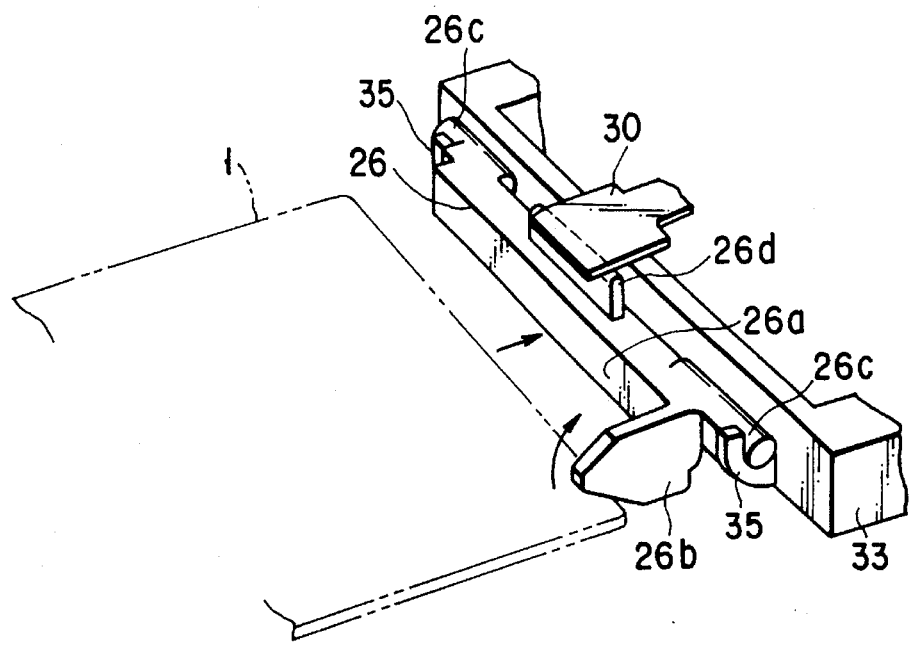
FIG. 5 is a perspective view showing the main part of the IC card processing apparatus of the first embodiment.

A shutter member 26 is arranged behind the card insertion port 23. The shutter member 26, as shown in FIG. 5, is integrally formed by a shutter plate 26a having a long side extending in the horizontal direction to close the card insertion port 23, a shutter lever 26b extending from one end of the shutter plate 26a toward the projecting portion 22c of the card slot 22 and having an inclined lower portion projecting toward the guide groove 24 of the projecting portion 22c, shafts 26c extending from both the ends of the shutter plate 26a in the side direction, and a projection 26d extending upward from the upper central end of the shutter plate 26a.

Note that the shafts 26c are pivotally supported by bearings 35 of a frame 31 (to be described later), the upper end of the projection 26d is in contact with the lower surface of a leaf spring 30 attached to a cover 29 (to be described later), and this leaf spring 30 biases the shutter member such that the shutter plate 26a and the shutter lever 26b face downward, i.e., a force for closing the card insertion port 23 acts on the shutter member.

In this shutter member 26, when the IC card 1 having a proper width is inserted to be supported between the guide grooves 24 of the card slot 22, the shutter lever 26b is pressed upward by a card passing through the guide groove 24 of the projecting portion 22b and pivoted upward using the shafts 26c on both the ends as fulcrums to retract the shutter plate 26a upward, thereby opening the card insertion port 23.

When a piece of paper or the like having a width smaller than that of the proper IC card 1 is to be directly inserted in the card insertion port 23, the shutter lever 26b is not pressed upward. For this reason, the card insertion port 23 is kept closed by the shutter plate 26a, and the piece of paper or the like can be prevented from being inserted from the card insertion port 23.

The housing 28 fixed on the rear portion of the card slot 22 is constituted by the cover 29 and the frame 31 whose upper surface is covered with the cover 29.

The cover 29 is fixed to have a stepped-down front portion brought into contact with the inner wall of the upper portion of the base portion 22a of the card slot 22. The leaf spring 30 for pressing the shutter member 26 downward is attached to the upper surface of the front end of the cover 29, and a regulating portion 29a formed to be depressed by one step is formed on the lower surface of the rear portion of the cover 29 to regulate upward movement of a slide member 45 (to be described later).

The frame 31 is formed to have an almost rectangular shape, and a middle plate 33 for vertically partitioning the interior of the frame is arranged at the middle stage portion of the frame 31. The frame 31 inserted from the card insertion port 23 is received into a card storage unit 34 surrounded by the lower surface of the middle plate 33 and inner walls 31a and 31a of the frame 31 extending vertically downward from both the sides of the middle plate 33.

The card storage unit 34 is formed to have the same width as that of the card insertion port 23, and the lower surface of the card storage unit 34 has a large opening in a range of the lower end of the rear portion of the card slot 22 to the rear end of the middle plate 33 to discharge a wrong card intentionally cut short, dust, or the like.

The bearings 35 for supporting the shafts 26c of the shutter member 26 extend from both the sides of the front end of the middle plate 33. In addition, three inclined portions 36 inclined downward toward the rear extend from the front end of the lower surface of the middle plate 33.

A terminal plate mounting hole 37 is formed to extend through the almost central portion of the middle plate 33. A terminal plate 38 is arranged in the terminal plate mounting hole 37 with screws or the like. Contact terminals 39 to be brought into contact with the external terminals of the an IC card, respectively, are arranged in a 2×4 matrix. Each of the contact terminals 39 consists of a conductive material (e.g., phosphor bronze or the like) having spring characteristics and is formed to be bent in a V shape. One end of each contact terminal 39 is fixed on the terminal plate 38, and the other end is inserted in a corresponding one of terminal holes 38 formed in the terminal plate 38, so that the contact terminals 39 are supported by the terminal plate 38. When the contact terminals 39 are pressed from the lower direction, the contact terminals 39 are moved upward while the contact terminals 39 are elastically deformed, and the elastic restoring force of the contact terminals 39 opposes the pressing force from the lower direction.

The inclined portions 36 guide a card inserted from the card insertion port 23 such that the leading end of the card is separated from the lower surface of the middle plate 33, and the contact terminals 39 projecting downward from the lower surface of the middle plate 33 are prevented from being deformed by the leading end of the card.

Spring grooves 40 are formed on both the sides of the terminal plate mounting hole 37, respectively, and spring hooks 41 are formed at the front ends of the spring grooves 40, respectively. The spring grooves 40 are formed to communicate with holes 42 vertically extending through both the ends of the rear portion of the frame.

On the rear portion side of the middle plate 33, a slide table 43 formed higher than the upper surface of the middle plate by one step extends to the rear portion of the frame to partition the holes 42.

Figure 6:
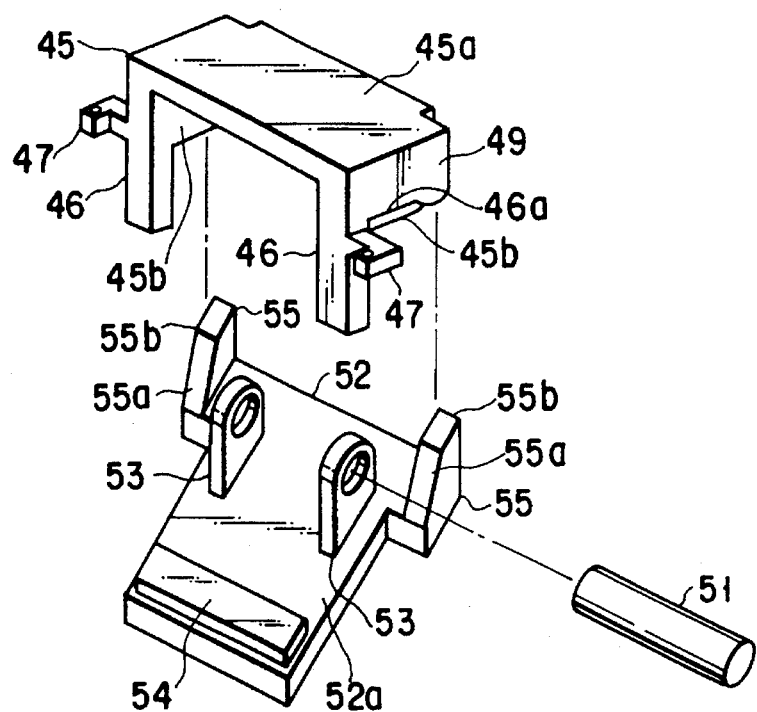
FIG. 6 is an exploded perspective view showing the main part of the IC card processing apparatus of the first embodiment.

A slide member 45 is mounted on the slide table 43. The slide table 43, as shown in FIG. 6, is constituted by an almost rectangular upper plate 45a and a pair of side plates 45b respectively extending downward from both the sides of the upper plate 45a. The slide table 43 is formed to have an almost U shape. The lower surface of the upper plate 45a is brought into contact with the upper surface of the slide table 43, and the slide table 43 is sandwiched by the slide member 45 and both the side plates 45b, so that the slide member 45 is supported to be slid back and forth.

Card receivers 46 vertically passing through the holes 42 on both the sides of the slide table 43 and extending to the card storage unit 34 are arranged at both the ends of the front portion of the upper plate 45a. These card receivers 46 are brought into contact with the leading end of a card inserted into the card storage unit 34 to slide the slide member 45 backward.

Spring hooks 47 are arranged at the middle portions of the card receivers 46, respectively, and springs 48 for returning the slide member 45 to a position where the card receivers 46 are brought into contact with the middle plate 33 when the card is removed suspend between the spring hooks 47 and the spring hooks 41 in the spring grooves 40 of the middle plate 33.

As shown in FIG. 6, cam portions 49 each having an arc-like outer periphery and brought into contact with a card pressing member 52 (to be described later) to pivot the card pressing member 52 when the slide member 45 is slid backward are formed on both the side plates 45b of the slide member 45, respectively.

Two bearings 50 extend from the lower surface of the slide table 43 along the widthwise direction of the slide table. A shaft 51 extends through the bearings 50, and the card pressing member 52 is pivotally supported by the shaft 51.

The card pressing member 52, as shown in FIG. 6, is formed like a T-shaped plate. Two bearings 53 extend from the upper portion of one surface 52a of the card pressing member 52, and an elastic member 54 consisting of rubber, sponge, or the like is fixed on the lower portion of the surface 52a. The card pressing member 52 is pivotally supported on the lower surface of the slide table 43 by the shaft 51 extending through the two bearings 53 such that the surface 52a faces the terminal plate 38.

On each side of the upper portion of the card pressing member 52, an opposing contact piece 55 extends toward one surface 46a of each side plate 45b of the slide member 45. The outer periphery of each of the contact pieces 55 is formed such that an inclined portion 55a inclined with respect to a corresponding one of the surfaces 46a is continuous with a parallel portion 55b parallel to the corresponding surface 46a. When the inclined portion 55a is in contact with the outer periphery of each cam portion 49 of the slide member 45, and the slide member 45 is slid backward, the card pressing member 52 is pivoted to being the lower portion of the card pressing member 52 close to the lower surface of the middle plate 33. When the slide member 45 is pressed to a position where its rear end is brought into contact with the inner wall of the rear portion of the frame, the card pressing member 52 becomes almost horizontal, and the parallel portion 55b is brought into contact with the cam portions 49.

A circuit board 60 is fixed on the upper surface of the middle plate 33. The circuit board 60 has a shape to cover the upper surface of the middle plate 33 and the holes 42 on both the sides of the slide table 43, and the upper surface side of the circuit board 60 is connected to one terminal of each of the contact terminals 39. In addition, a microswitch 61 serving as a sensor for detecting that a card is inserted deep is attached to the lower surface of the rear portion of the circuit board 60. In one of the holes 42 on both the sides of the slide table 43, the microswitch 61 is arranged at a position where the microswitch 61 is turned on by pressing a movable portion 61a of the microswitch 61 by the rear portion of one of the spring hooks 47 when the slide member 43 is pressed to the rearmost position.

Note that the contact terminals 39 and the microswitch 61 are connected to the control unit (not shown) of, e.g., a public telephone set, through the circuit board 60. This control unit controls normal speech communication and also determines insertion/removal of a card on the basis of the ON/OFF state of the microswitch 61 to update call rate information of an inserted card through the contact terminals 39.

The operation of the IC card processing apparatus 20 according to the first embodiment will be described below.

Figure 7A:
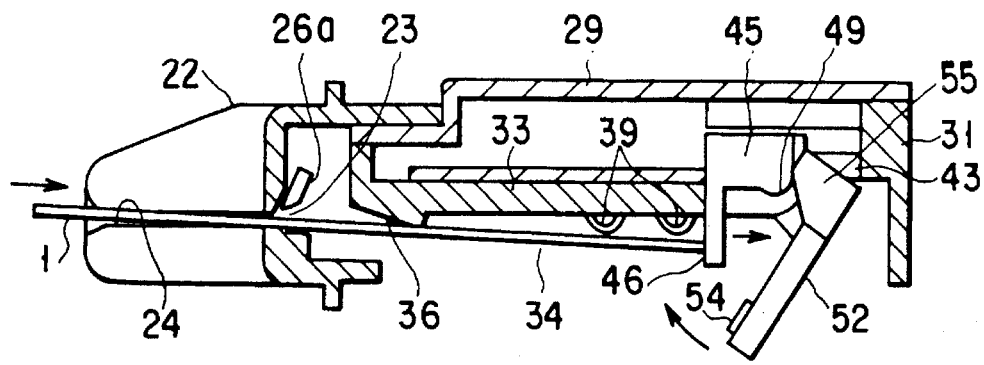
FIGS. 7A and 7B are schematic side views showing the IC card processing apparatus of the first embodiment when a proper card is inserted into the IC card processing apparatus.

When the IC card 1 is inserted into the card insertion port 23 such that both the sides of the IC card 1 are supported by the guide grooves 24 of the card slot 22, the shutter lever 26b is pressed upward, and the shutter plate 26a is retracted upward from the rear portion of the card insertion port 23, thereby guiding the card into the card storage unit 34. The card inserted into the card storage unit, as shown in FIG. 7A, passes below the contact terminals 39 while the card is slightly pressed downward by the inclined portions 36, and the leading end of the card is brought into contact with the card receivers 46 of the slide member 45.

Figure 7B:
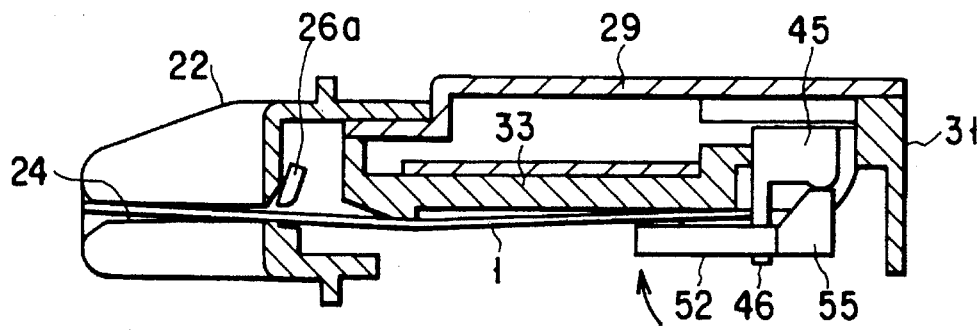

When the card is inserted deeper, the card presses the slide member 45 to slide the slide member 45 backward, and the card pressing member 52 having the inclined portions 55a of the contact pieces 55 circumscribed to the cam portions 49 of the slide member 45 is pivoted to bring one surface of the card pressing member 52 close to the terminal plate 38. As shown in FIG. 7B, when the slide member 45 is slid to a position where the slide member 45 is brought into contact with the inner wall of the rear portion of the frame 31, the card pressing member 52 is pivoted to be kept almost horizontal, and the card 1 is pressed upward from the lower surface by the elastic member 54, thereby bringing external terminals 2 of the card into contact with the contact terminals 39, respectively.

At this time, the middle portion of the card 1 is slightly pressed downward by the inclined portions 36, and the external terminal portion is pressed upward by the card pressing member 52. For this reason, a force for bending the card acts on the contact portions between the card and the inclined portions 36. However, this force is weak, and no integrated circuit is incorporated in the contact portion of the card. Therefore, the card is not disabled.

In addition, the returning force of the slide member 45 generated by the springs 48 is preset to be weaker than a friction force acting on the card and generated by slightly bending the card 1, and the cam portions 49 of the slide member 45 are kept in contact with the parallel portions 55b of the contact pieces 55 of the card pressing member 52 and receive only the upward moments of the card pressing member 52. For this reason, if the card is left in this state, the card will not return.

Note that, in this state, the movable portion 61a is pressed by one of the spring hooks 47 of the slide member 45 to turn on the microswitch 61.

When it is detected that the microswitch 61 is turned on, call rate information of the memory in the IC card is read out through the contact terminals 39, and a process of subtracting a charge amount is performed. Upon completion of speech communication, when the card is removed, the slide member 45 is returned forward by the springs 48, and the microswitch 61 is turned off. The card pressing member 52 is pivoted by its own weight, and the card pressing member 52 is returned to the original state (state shown in FIG. 2).

Figure 8:
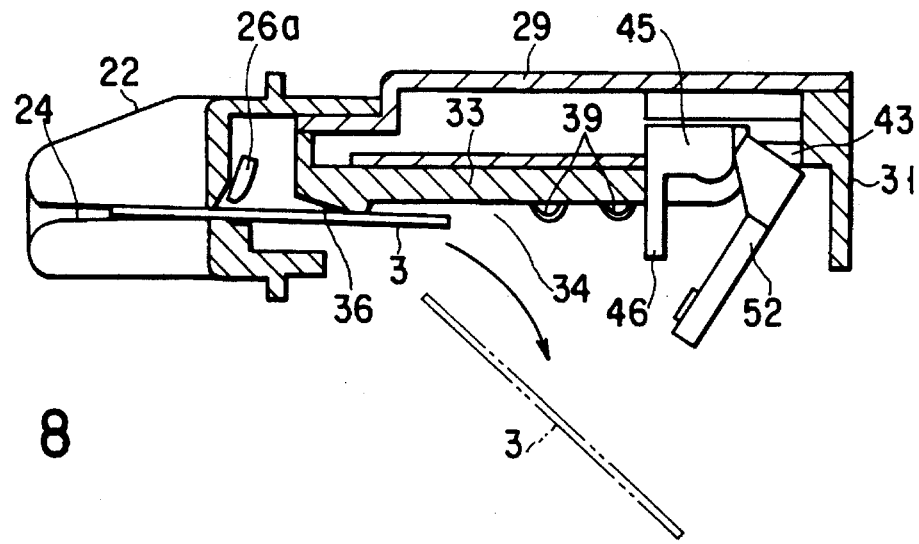
FIG. 8 is a schematic side view showing the IC card processing apparatus of the first embodiment when a wrong card is inserted into the IC card processing apparatus.
Figure 9:
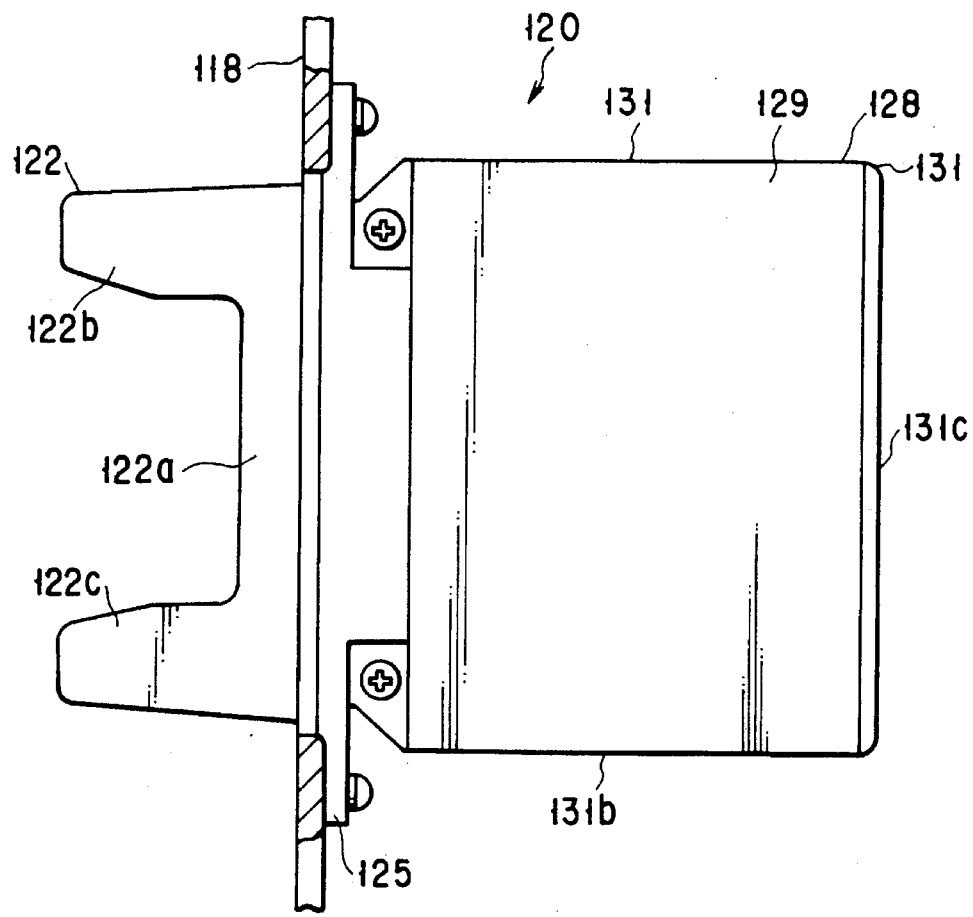
FIG. 9 is a plan view showing an IC card processing apparatus according to the second embodiment of the present invention.
Figure 10:
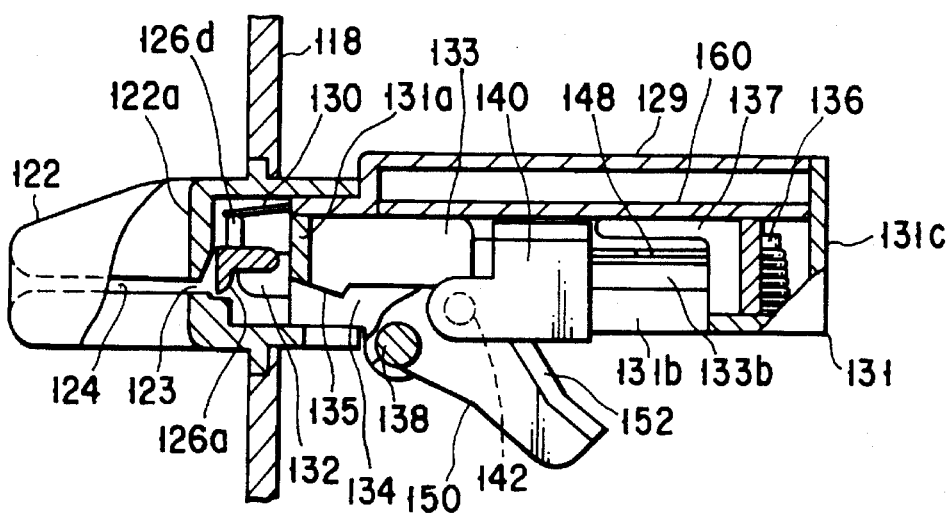
FIG. 10 is a partially cutaway side view showing the IC card processing apparatus of the second embodiment.

For example, as shown in FIG. 8, when a wrong card 3 having a length smaller than the distance from the card insertion port 23 to the card receivers 46 is inserted from the card insertion port 23, the trailing end of the wrong card 3 enters the card storage unit 34 before the wrong card 3 reaches the card receivers 46 of the slide member 45. For this reason, the wrong card is discharged downward from the open lower surface of the card storage unit 34. Therefore, the wrong card 3 does not adversely affect the next card insertion, and use of the apparatus is not disabled.

When a wrong card having a length larger than the distance from the card insertion port 23 and the card receivers 46 and smaller than that of a proper card is inserted from the card insertion port 23, this card cannot completely press the slide member 45 to the rearmost position. For this reason, a force for returning the card is always generated by the springs, and this wrong card is discharged when a hand is removed from the wrong card. In addition, assuming that the wrong card is forcibly inserted from the card insertion port 23 to close the shutter plate 26a, when a next card is inserted to retract the shutter plate 26a upward, the wrong card is returned to the card insertion port 23. Otherwise, the trailing end of the wrong card is moved upward by the shutter plate 26a, and the leading end of the wrong card is slid below the card receivers 46, thereby discharging the wrong card from the opening portion of the card storage unit 34. For this reason, the next card insertion can be performed without any trouble.

As has been described above, in this IC card processing apparatus, even when a forcible external force does not act on a proper card, the proper card can be certainly received to a position where the external terminals are brought into contact with the contact terminals, respectively, and a card jam caused by a wrong card which is intentionally cut to have a small length can be prevented.

In the first embodiment, an IC card inserted from the card insertion port is guided into the card storage unit such that the IC card is slightly moved downward. However, the present invention is not limited to the first embodiment. For example, in place of the inclined portions 36 of the middle plate 33, a mechanism (cam mechanism, link mechanism, or the like) interlocked with the sliding operation of the slide member 45 to move downward the contact terminals or a terminal plate supporting the contact terminals may be arranged. In this state, the lower surface of the inserted card may be pressed upward by the card pressing member 52 to move the contact terminals downward, thereby bringing the contact terminals into contact with the external terminals, respectively. In this manner, any bending force need not act on the inserted card.

In the first embodiment, although the card slot 22 having the card insertion port and the frame 31 are formed as different units, they may be integrally formed. In addition, the shapes of the card slot 22 and the frame 31 can be variably changed.

In the first embodiment, the present invention is applied to an IC card processing apparatus for manually inserting and removing a card. However, the present invention can be applied to the following IC card processing apparatus. That is, in the IC card processing apparatus, a mechanism for conveying an inserted card is arranged between a card insertion port and a card storage unit, the card inserted from the card insertion port is received into the card storage unit, and the card from/in which information has been read/ written is discharged from the card insertion port or a card discharge port.

In the first embodiment, a card processing apparatus for performing read/write process to, e.g., a prepaid IC card has been described. However, the present invention can be similarly applied to an IC card processing apparatus for reading information from an IC card serving as an ID card for identifying an individual.

As has been described above, in an IC card processing apparatus according to the first embodiment of the present invention, a card inserted from a card insertion port is guided to a card storage unit having an opening formed in the lower surface thereof, and a slide member brought into contact with the leading end of the card is slid backward to pivot a card pressing member. The inserted card is pressed from the lower surface onto contact terminals arranged at the upper portion of the card storage unit, thereby bringing the external terminals of the card into contact with the contact terminals, respectively.

For this reason, in the IC card processing apparatus according to the first embodiment of the present invention, a proper card can be certainly received to a terminal contact position without causing a force for forcibly bending the external terminal portion of the proper IC card to act on the proper IC card, and a card jam caused by inserting a wrong card shorter than the proper card can be prevented.

The second embodiment of the present invention will be generally described below. In order to solve the above problems, an IC card processing apparatus according to the second embodiment of the present invention comprises a card slot having a card insertion port for receiving an IC card, a frame for receiving the IC card, which is inserted from the card insertion port of the card slot, into a card storage unit having an opening formed in a lower surface thereof, a slide member arranged on the upper portion of the card storage unit of the frame to be slid along an IC card insertion direction, biased by a biasing means toward the IC card insertion, having contact terminals formed on a lower surface side of the slide member to be brought into contact with the external terminals of the IC card, respectively, and slid deep against the biasing force when the slide member is pressed by the leading end of the IC card inserted from the card insertion port, and a card pressing member pivotally attached to the frame and pressed and pivoted by the slide member when the slide member is slid deep by inserting the IC card, thereby pressing the IC card from the lower surface side to the contact terminal side.

Since the IC card processing apparatus is arranged as described above, in the IC card processing apparatus according to the second embodiment of the present invention, when an IC card is inserted from the card insertion port into the card storage unit, the slide member in the frame is slid deep by the leading end of the IC card, and the card pressing member pressed by the slide member is pivoted to press the IC card from the lower side to the contact terminal side, thereby bringing the contact terminals into contact with the external terminals of the card, respectively.

The second embodiment of the present invention will be described below with reference to the accompanying drawings.

FIGS. 9 to 15 show an IC card processing apparatus 120 according to the second embodiment of the present invention. This IC card processing apparatus 120 is arranged in a housing 118 of a public telephone set used by a user with a prepaid IC card, for example. An IC card manually inserted by the user is received to a position where the IC card can be removed after the public telephone set is used, and call rate information recorded on the IC card is updated.

The IC card processing apparatus 120 is constituted by a card slot 122 fixed to project from the housing 118 to receive the IC card from the outside and a housing 128 fixed to the rear portion of the card slot 122.

The card slot 122 is constituted by a base portion 122*a* having a card insertion port 123 formed on the front surface side thereof and opposing projecting portions 122*b* and 122*c* projecting forward from both the sides of the base portion 122*a*. The card slot 122 is formed to have an almost U shape when viewed from the upper direction. The interval between the opposing surfaces of the two projecting portions 122*b* and 122*c* is set to be smaller than the width of the IC card. Guide grooves 124, communicating with the card insertion port 123, for horizontally guiding the IC card inserted from the user side are arranged on the opposing surfaces of the projecting portions, respectively.

Flanges 125 are arranged on both the sides of the card slot 122. Since the flanges 125 are mounted on the inner surface side of the housing 118 with screws or the like, the IC card processing apparatus 120 is entirely supported by the housing 118.

Figure 11:
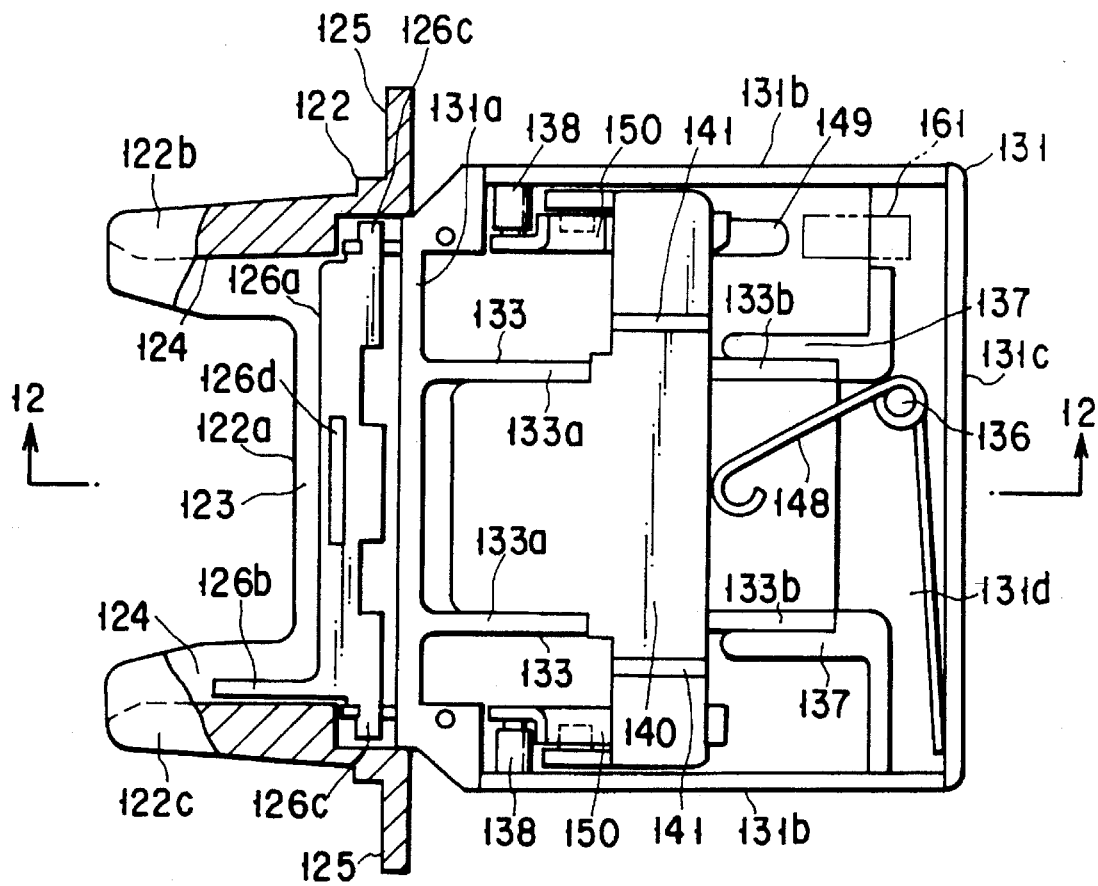
FIG. 11 is a plan view showing the IC card processing apparatus of the second embodiment in which a cover and a circuit board are not illustrated.
Figure 12:
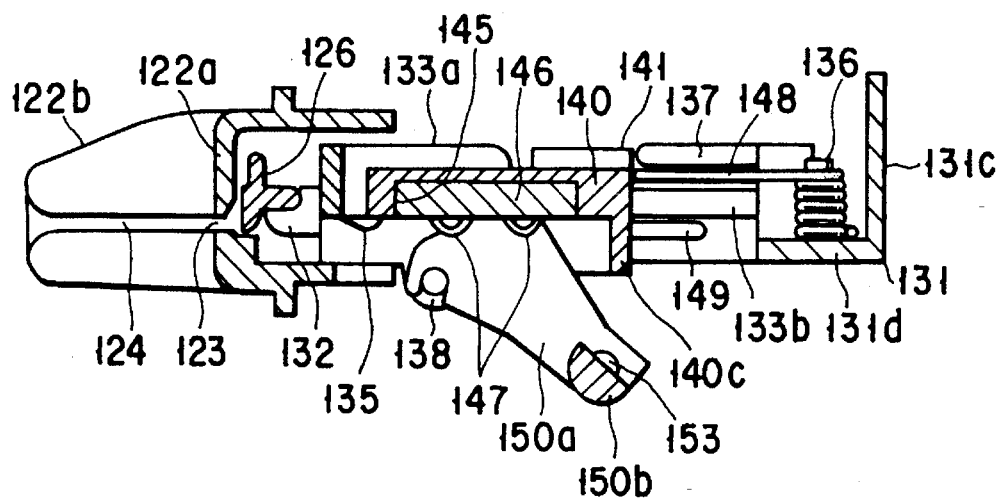
FIG. 12 is a sectional view showing the IC card processing apparatus along a line 12—12 in FIG. 11.
Figure 13:
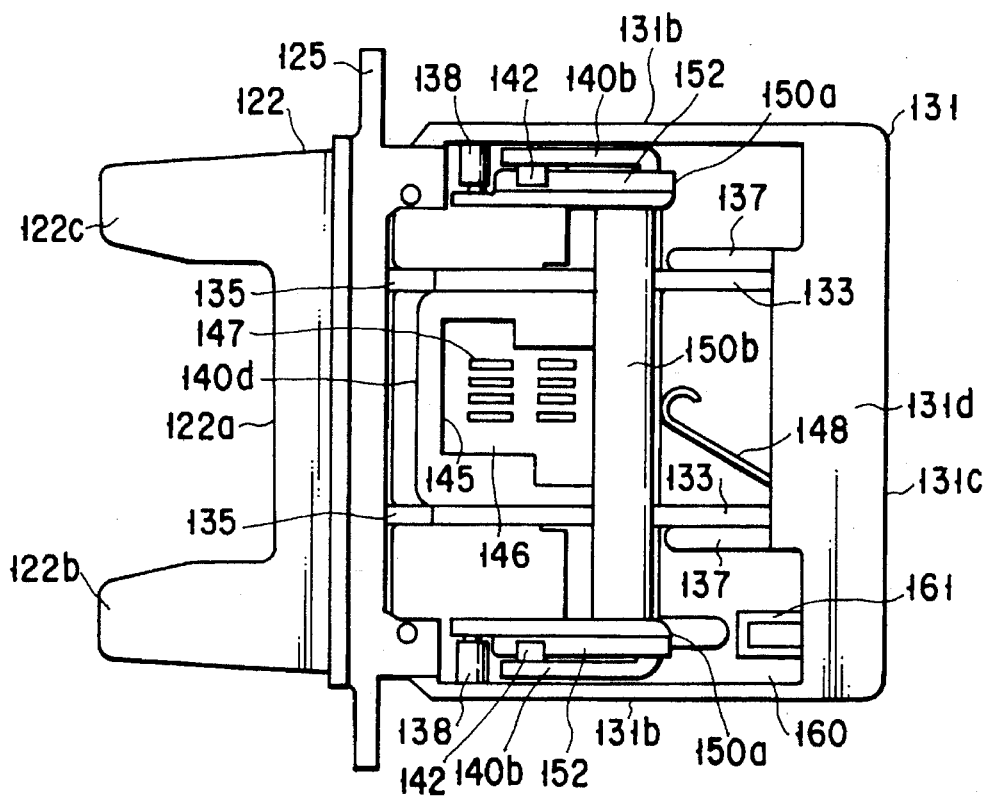
FIG. 13 is a bottom view showing the IC card processing apparatus of the second embodiment.
Figure 14:
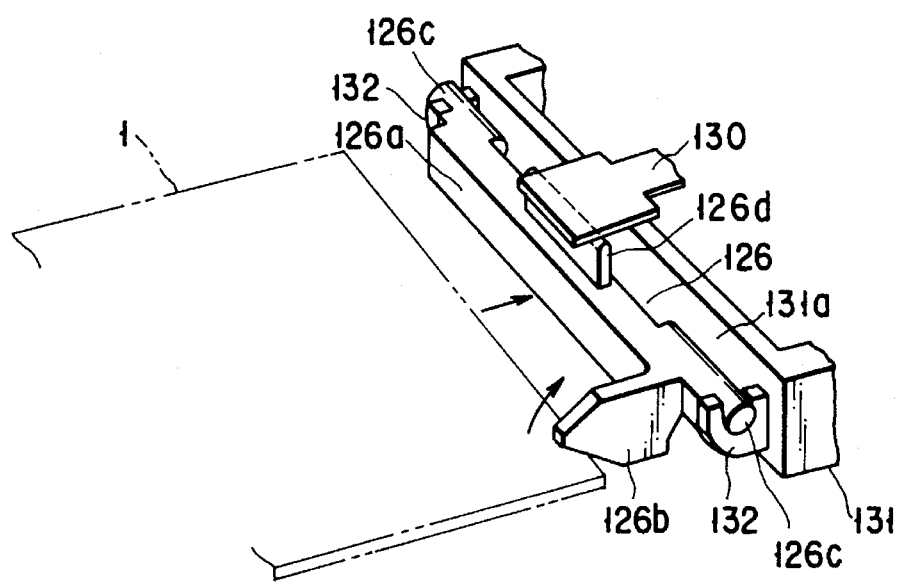
FIG. 14 is a perspective view showing the main part of the IC card processing apparatus of the second embodiment.

A shutter member 126 is arranged behind the card insertion port 123. The shutter member 126, as shown in FIGS. 11 and 14, is integrally formed by a shutter plate 126*a* having a long side extending in the horizontal direction to close the card insertion port 123, a shutter lever 126*b* extending from one end of the shutter plate 126*a* toward the projecting portion 122*c* of the card slot 122 and having an inclined lower portion projecting toward the guide groove 124 of the projecting portion 122*c*, shafts 126*c* extending from both the ends of the shutter plate 126*a* in the side direction, and a projection 126*d* extending upward from the upper central end of the shutter plate 126*a*.

Note that the shafts 126*c* are pivotally supported by bearings 132 of a frame 131 (to be described later). The upper end of the projection 126*d* is in contact with the lower surface of a leaf spring 130 attached to a cover 129 (to be described later), and this leaf spring 130 biases the shutter member such that the shutter plate 126*a* and the shutter lever 126*b* face downward, i.e., a force for closing the card insertion port 123 acts on the shutter member.

In this shutter member 126, when the IC card having a proper width is inserted to be supported between the guide grooves 124 of the card slot 122, the shutter lever 126*b* is pressed upward by a card passing through the guide groove 124 of the projecting portion 122*b* and pivoted upward using the shafts 126*c* on both the ends as fulcrums to retract the shutter plate 126*a* upward, thereby opening the card insertion port 123. When a piece of paper or the like having a width smaller than that of the proper IC card is to be directly inserted in the card insertion port 123, the shutter lever 126*b* is not pressed upward. For this reason, the card insertion port 123 is kept closed by the shutter plate 126*a*, and the piece of paper or the like can be prevented from being inserted from the card insertion port 123.

The housing 128 fixed on the rear portion of the card slot 122 is constituted by the cover 129 and the frame 131 whose upper surface is covered with the cover 129.

The cover 129 is fixed to have a stepped-down front portion brought into contact with the inner wall of the upper portion of the base portion 122*a* of the card slot 122. The leaf spring 130 for pressing the shutter member 126 downward is attached to the upper surface of the front end of the cover 129.

The frame 131 is formed by a front plate 131*a*, side plates 131*b*, and a rear plate 131*c* to have an almost rectangular frame-like shape. The lower surface of the frame 131 is open except for a portion of a bottom plate 131*d* slightly extending forward from the lower end of the rear plate 131*c*.

The bearings 132 for supporting the shafts 126*c* of the shutter member 126 extend from both the ends of the front plate 131*a*. The interior of the frame is partitioned into three parts in the widthwise direction by two parallel middle plates 133. A card inserted from the card insertion port 123 and passing through the lower portion of the front plate 131*a* is surrounded by the lower surfaces of the middle plates 133 and the side plates 131*b* of the frame 131 and received into a card storage unit 134 having a large opening formed in a lower surface thereof.

High step portions 133*a* extending to a position to sandwich the front portion of the cover 129 with the upper wall of the base portion of the card slot 122 are arranged at the front portion of the middle plates 133, respectively. Rail portions 133*b*, formed at a level lower than that of the high step portions 133*a* by one step, for supporting a slide member 140 (to be described later) to be slid back and forth are arranged at the rear portions of the middle plates 133, respectively.

Inclined portions 135 inclined downward toward the rear portion extend from the front ends of the lower surfaces of the high step portions 133*a*, respectively. In order to prevent contact terminals 147 (to be described later) from being deformed such that the contact terminals 147 are directly pressed by the leading end of the inserted card, the inclined portions 135 guide the leading end of the card inserted from the card insertion port 123 to separate the leading end of the card from the lower surfaces of the middle plates 133.

A spring shaft 136 vertically extends from the upper portion of the bottom plate 131*d* of the frame 131. On both the sides of the spring shaft 136, guide projections 137 extending with an interval slightly larger than that of the middle plates 133 toward the card slot are formed to guide the backward movement of the slide member 140 (to be described later) on the upper sides of the guide projections 137. Support shafts 138 for pivotally supporting a card pressing member 150 (to be described later) extend from the front ends of the inner walls of the side plates 131*b* of the frame 131, respectively.

The slide member 140 is mounted to be slid back and forth on the rail portions 133*b* of the middle plates 133 of the frame 131. The slide member 140, as shown in FIG. 15, is integrally formed by an upper plate 140*a* formed to have an almost T shape when viewed from the upper direction, side plates 140*b*, and a rear plate 140*c* extending vertically downward from the rear end of the upper plate 140*a*.

The upper plate 140*a* has a width larger than that of an IC card, and a central portion 140*d* of the upper plate 140*a* largely extends forward with a width almost equal to the interval between the middle plates 133 of the frame 131. Ribs 141 extend from the upper surface of the upper plate 140*a* with an interval such that the ribs 141 are circumscribed to the guide projections 137, respectively.

Column-like shafts 142 for pivoting the card pressing member 150 (to be described later) extend inward from the inner sides on the distal end sides of both the side plates 140*b* of the slide member 140. In addition, slits 143 for receiving the rail portions 133*b* of the middle plates 133 from the lower direction and regulating the lateral movement of the slide member 140 to move the slide member 140 in only the forward and backward directions are formed in the rear plate 140c. The rear plate 140c is located at a position where the rear plate 140c traverses the card storage unit 134, and the rear plate 140c is brought into contact with the leading end of the card inserted from the card insertion port to transmit a force of a card insertion direction to the slide member 140.

A terminal plate mounting hole 145 is formed to be recessed in a predetermined depth on the lower surface side of the central portion 140d of the slide member 140. A terminal plate 146 is fixed in the terminal plate mounting hole 145 with screws.

Contact terminals 147 to be brought into contact with the external terminals of the an IC card, respectively, are arranged in a 2×4 matrix on the lower surface side of terminal plate 146. Each of the contact terminals 147 consists of a conductive material (e.g., phosphor bronze or the like) having spring characteristics and is formed to be bent in a V shape. One end of each contact terminal 147 is fixed on the terminal plate 146, and the other end is inserted in a corresponding one of terminal holes (not shown) formed in the terminal plate 146, so that the contact terminals 147 are supported by the terminal plate 146. When the contact terminals 147 are pressed from the lower direction, the contact terminals 147 are moved upward while the contact terminals 147 are elastically deformed, and the elastic restoring force of the contact terminals 147 opposes the pressing force from the lower direction.

Note that one end of a spring 148 hooked on the spring shaft 136 is brought into contact with the rear plate 140c of the slide member 140 from the backward direction, and the slide member 140 is always biased toward the card insertion port by the elastic force of the spring 148. In addition, a projection 149 for turning on a microswitch 161 (to be described later) when the slide member 140 is pressed to the rearmost position extends backward from the rear plate 140c.

The card pressing member 150 is arranged below the slide member 140. The card pressing member 150, as shown in FIG. 15, is integrally formed by opposing arm plates 150a arranged with an interval smaller than the interval between the side plates 140b of the slide member 140 and slightly larger than the width of an IC card and a semi-columnar elongated plate 150b for connecting the distal ends of the two arm plates 150a to each other.

Each of the arm plates 150a is formed to have a height decreased from one end to the other end, and each bearing 151 fitted on a corresponding one of the support shafts 138 of the frame 131 is formed in the lower portion of one end of a corresponding one of the arm plates 150a. In addition, contact pieces 152 projecting outward with a predetermined width are formed on the upper edges of the arm plates 150a, respectively.

The contact pieces 152 are pressed by the shafts 142 of the slide member 140 to transmit a rotating force to the card pressing member 150, and each of the contact pieces 152 is constituted by a parallel portion 152a parallel to the upper surface of the pressing plate 150b and an inclined portion 152b inclined from one end to the other end of the arm plate 150a and continuous with the contact pieces 152. Note that two elastic members 153 which consist of rubber or sponge and are linearly arranged are fixed on the upper surface of the pressing plate 150b.

when the slide member 140 is in contact with the high step portions 133a of the middle plates 133, the shafts 142 of the slide member 140, as shown in FIG. 16A, are located at the lower portions of the contact pieces 152 of the arm plates 150a, respectively. When the slide member 140 is slid backward, and the shafts 142 are moved backward while the shafts 142 are brought into contact with the lower surfaces of the inclined portions 152b, the card pressing member 150 is pivoted counterclockwise. The card pressing member 150, as shown in FIG. 16B, is pivoted until the shafts 142 reach the lower surfaces of the parallel portions 152a of the contact pieces 152 to set the upper surface of the pressing plate 150b to be horizontal, thereby pressing the lower surface of an inserted card upward.

A circuit board 160 is fixed on the high step portions 133a of the middle plates 133 and the upper surfaces of the guide projections 137. The circuit board 160 is connected, through, e.g., a flexible board (not shown), to the contact terminals 147 attached to the slide member 140. In addition, the microswitch 161 serving as a sensor for detecting that a card is inserted deep is attached to the lower surface of the rear portion of the circuit board 160. The microswitch 161 is arranged at a position where the microswitch 161 is turned on by pressing its movable portion by the projection 149 when the slide member 140 is pressed to the rearmost position.

Note that the contact terminals 147 and the microswitch 161 are connected to the control unit (not shown) of a public telephone set through the circuit board 160, for example. This control unit controls normal speech communication and also determines insertion/removal of a card on the basis of the ON/OFF state of the microswitch 161 to update call rate information of an inserted card through the contact terminals 147.

The operation of the IC card processing apparatus 120 according to the second embodiment will be described below.

When an IC card 1 is inserted into the card insertion port 123 such that both the sides of the IC card 1 are supported by the guide grooves 124 of the card slot 122, the shutter lever 126b is pressed upward, and the shutter plate 126a is retracted upward from the rear portion of the card insertion port 123, thereby guiding the card into the card storage unit 134.

Figure 17A:
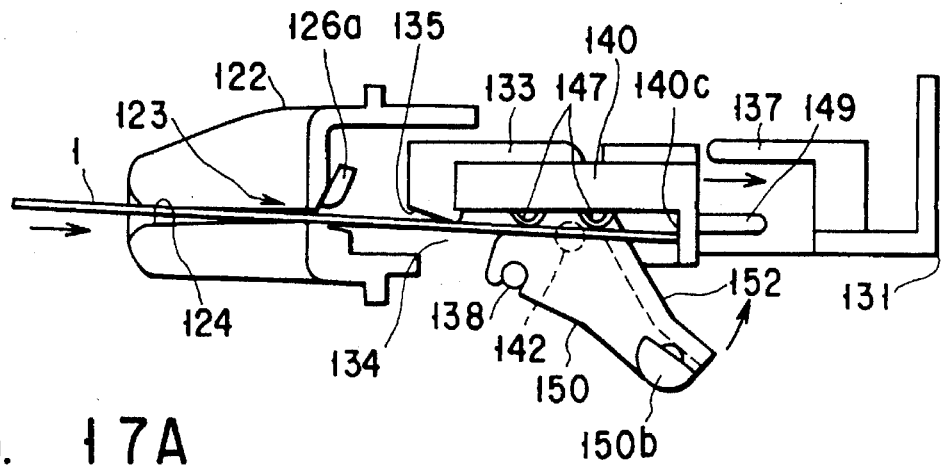
FIGS. 17A and 17B are schematic side views showing the IC card processing apparatus of the second embodiment when a proper card is inserted into the IC card processing apparatus.

The card inserted into the card storage unit 134, as shown in FIG. 17A, passes through the lower portion of the contact terminals 147 while the card is slightly pressed downward by the inclined portions 135, and the leading end of the card is brought into contact with the rear plate 140c of the slide member 140.

When the card is inserted deeper, the card presses the slide member 140 to slide member 140 backward, and the shafts 142 of the slide member 140 are brought into contact with the inclined portions 152b of the contact pieces 152 of the card pressing member 150, and the card pressing member 150 is pivoted such that the pressing plate 150b is brought close to the lower surface of the slide member 140. Note that, in this sliding operation, the upward movement of the slide member 140 is regulated by the lower surface of the circuit board 160 and the guide projections 137.

Figure 17B:
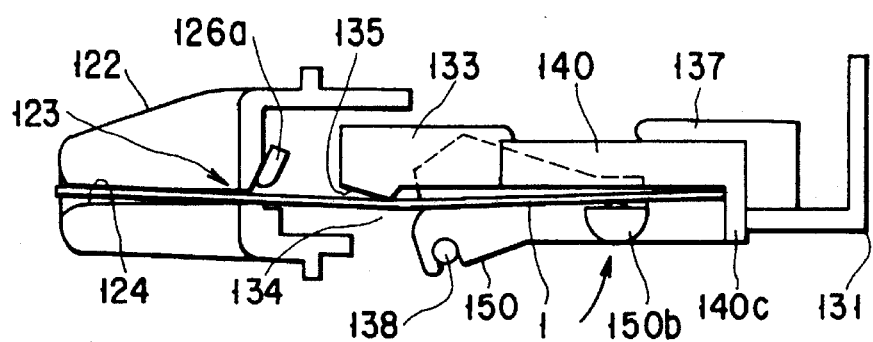

As shown in FIG. 17B, when the slide member 140 is slid to a position such that the slide member 140 is brought into contact with the vertical upright portions of the guide projections 137 of the frame 131, the card pressing member 150 is pivoted until the upper surface of the pressing plate 150b of the card pressing member 150 is set to be almost horizontal, and the card 1 is pressed upward from the lower surface by the elastic member 153, thereby bringing external terminals 2 of the card 1 into contact with the contact terminals 147, respectively.

At this time, the middle portion of the card 1 is slightly pressed downward by the inclined portions 135, and the external terminal portion is pressed upward by the card pressing member 150. For this reason, a force for bending the card acts on the contact portions between the card and the inclined portions 135. However, this force is weak, and no integrated circuit is incorporated in the contact portion of the card. Therefore, the card is not disabled.

In addition, the returning force of the slide member 140 generated by the spring 148 is preset to be weaker than a friction force acting on the card and generated by slightly bending the card 1, and the shafts 142 of the slide member 140 are kept in contact with the parallel portions 152a of the contact pieces 152 of the card pressing member 150 and receive only the downward moments of the card pressing member 150. For this reason, if the card is left in this state, the card will not return.

In this state, the microswitch 161 is pressed by the projection 149 of the slide member 140 to turn on the microswitch 161.

When it is detected that the microswitch 161 is turned on, call rate information of the memory in the IC card is read out through the contact terminals 147, and a process of subtracting a charge amount. Upon completion of speech communication, when the card is removed, the slide member 140 is returned forward by the spring 148, and the microswitch 161 is turned off. The card pressing member 150 is pivoted by its own weight, and the card pressing member 150 is returned to the original state (state shown in FIG. 10).

Figure 18:
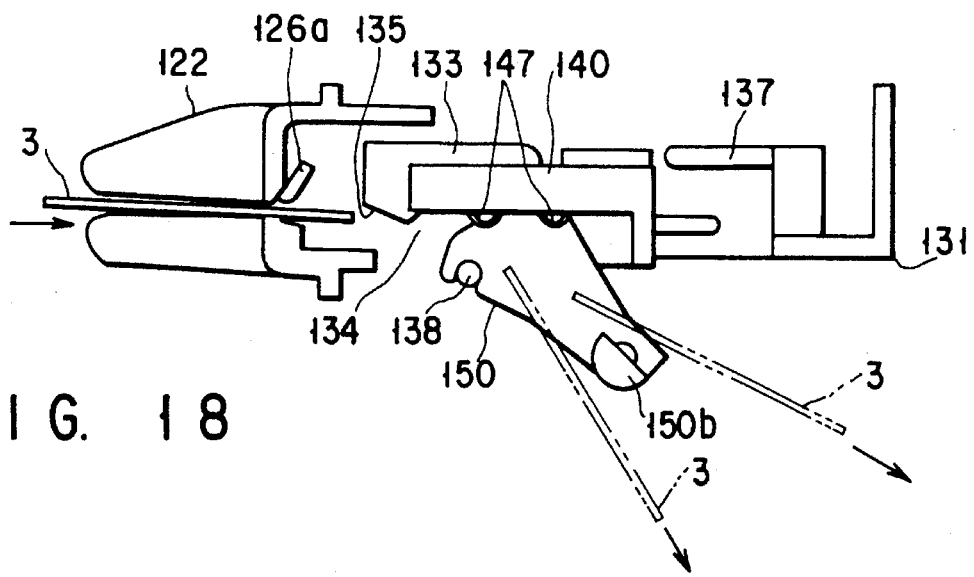
FIG. 18 is a schematic side view showing the IC card processing apparatus of the second embodiment when a wrong card is inserted into the IC card processing apparatus.

For example, as shown in FIG. 18, when a wrong card 3 having a length smaller than the distance from the card insertion port 123 to the rear plate 140c of the slide member 140 is inserted from the card insertion port 123, the trailing end of the wrong card 3 enters the card storage unit 134 before the wrong card 3 reaches the rear plate 140c. For this reason, the wrong card is discharged downward from the open lower surface of the card storage unit 134. Therefore, the wrong card 3 does not adversely affect the next card insertion, and use of the apparatus is not disabled.

When a wrong card having a length larger than the distance from the card insertion port 123 and the rear plate 140c of the slide member 140 and smaller than that of a proper card is inserted from the card insertion port 123, this card cannot completely press the slide member 140 to the rearmost position. For this reason, a force for returning the card is always generated by the spring 148, and this wrong card is discharged when a hand is removed from the wrong card. In addition, assuming that the wrong card is forcibly inserted from the card insertion port 123 to close the shutter plate 126a, when a next card is inserted to retract the shutter plate 126a upward, the wrong card is returned to the card insertion port 123. Otherwise, the trailing end of the wrong card is moved upward by the shutter plate 126a, and the leading end of the wrong card is slid below the rear plate 140c of the slide member 140, thereby discharging the wrong card from the opening portion of the card storage unit 134. For this reason, the next card insertion can be performed without any trouble.

As has been described above, in this IC card processing apparatus, even when a forcible external force does not act on a proper card, the proper card can be certainly received to a position where the external terminals are brought into contact with the contact terminals, respectively, and a card jam caused by a wrong card which is intentionally cut to have a small length can be prevented.

In the second embodiment, an IC card inserted from the card insertion port is guided into the card storage unit such that the IC card is slightly moved downward. However, the present invention is not limited to the second embodiment. For example, in place of the inclined portions 135 of the middle plates, a mechanism (cam mechanism, link mechanism, or the like) interlocked with the sliding operation of the slide member 140 to move downward the contact terminals or a terminal plate supporting the contact terminals may be arranged. In this state, the lower surface of the inserted card may be pressed upward by the card pressing member 150 to move the contact terminals downward, thereby bringing the contact terminals into contact with the external terminals, respectively. In this manner, any bending force need not act on the inserted card.

In the second embodiment, although the card slot having the card insertion port and the frame are formed as different units, they may be integrally formed. In addition, these shapes of parts including the card pressing member are not limited to the second embodiment, and the shapes can be variably changed.

Figure 19:
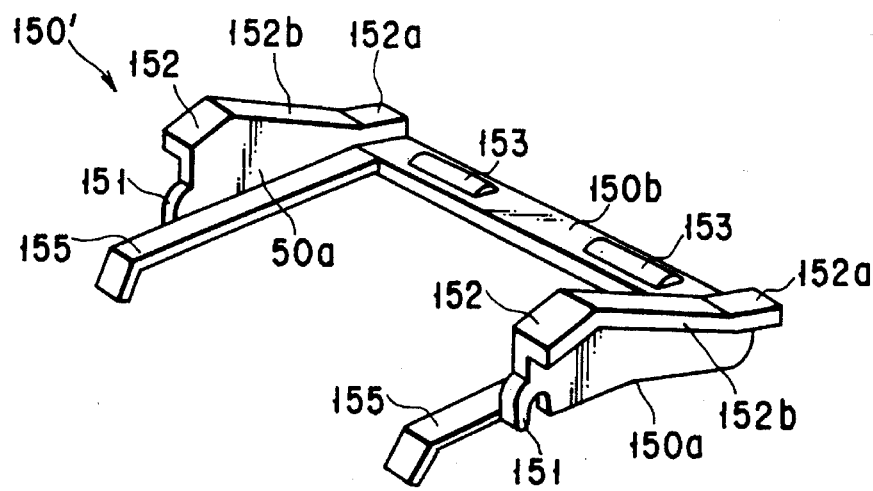
FIG. 19 is a perspective view showing a modification of the pressing member in the IC card processing apparatus of the second embodiment.
Figure 20:
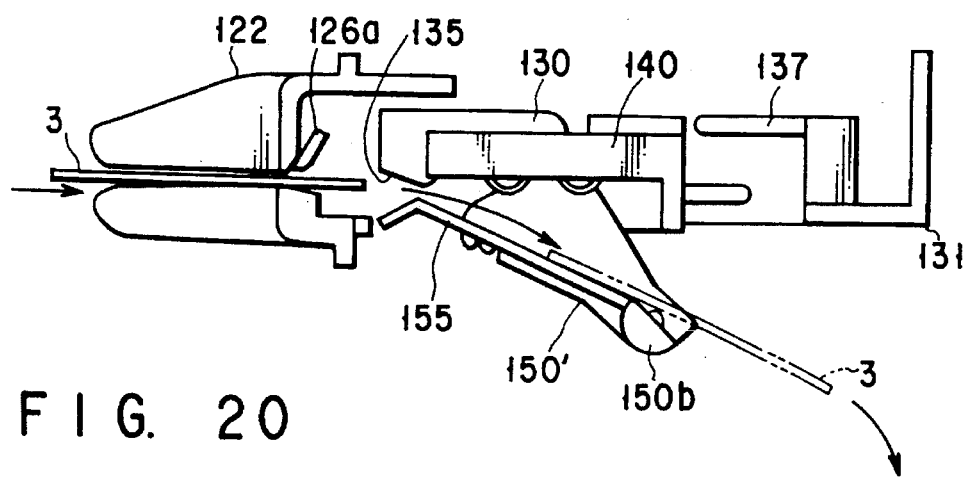
FIG. 20 is a schematic side view showing the IC card processing apparatus using the card pressing member in FIG. 19 when a wrong card is inserted into the IC card processing apparatus.
Figure 21:
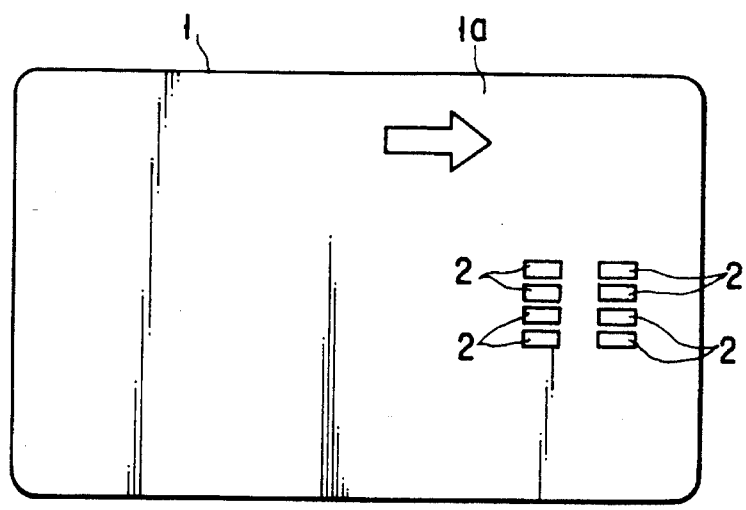
FIG. 21 is a view showing a conventionally known IC card.
Figure 22:
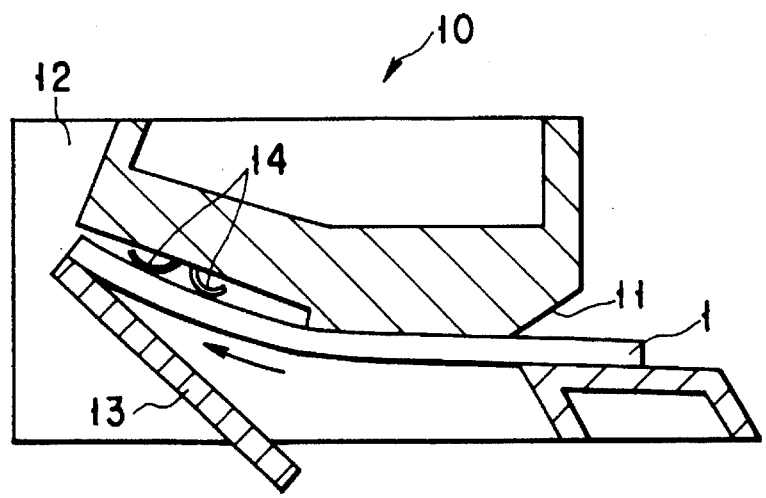
FIG. 22 is a schematic side view showing the structure of a conventional IC card processing apparatus.
Figure 23:
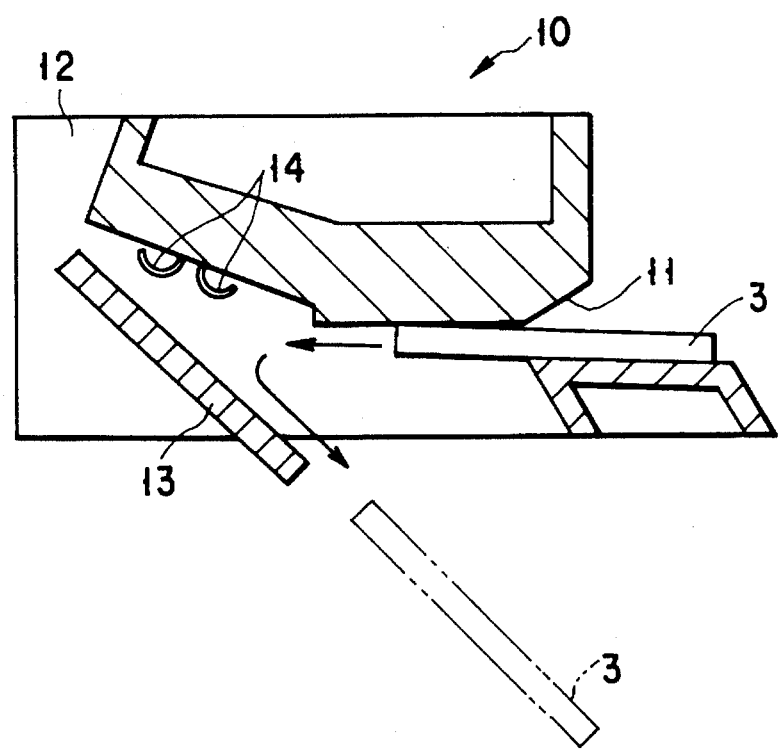
FIG. 23 is a schematic side view showing a conventional IC card processing apparatus when a wrong card is inserted into the conventional IC card process apparatus.

For example, as shown in FIG. 19, a card pressing member 150' having guide plates 155 for discharging a wrong card on the inner wall sides of both the arm plates 150a may be used. In use of this card pressing member 150', as shown in FIG. 20, when the wrong card 3 having a small length is inserted from the card insertion port 123, this card passes between the inclined portions 135 and one end of each of the guide plates 155, the card 3 is discharged in a predetermined inclined lower direction while both the ends of the lower surface of the card 3 are supported by the upper surface of the guide plates 155. In addition, a wrong card having a width smaller than the interval between the guide plates 155 is discharged downward from the interval therebetween. Note that the guide plates 155 are connected to the upper surface of the pressing plate 150b at an angle such that the wrong card slid on the guide plates 155 passes above the elastic members 153 on the pressing plate 150b.

In addition, when the elastic members 153 are not used, the angle between each of the guide plates 155 and the upper surfaces of the pressing plate 150b can be set such that the guide plates 155 and the card pressing member 150 are linearly arranged. With this arrangement, a wrong card can be discharged in the same manner as described above. Moreover, when a proper card is inserted, the arm plates 150a and the guide plates 155 press upward both the ends of the lower surface of the card in a wide range. For this reason, the card can be brought into contact with the contact terminals while the card has a stabler posture.

In the second embodiment, the present invention is applied to an IC card processing apparatus for manually inserting and removing a card. However, the present invention can be applied to the following IC card processing apparatus. That is, in the IC card processing apparatus, a mechanism for conveying an inserted card is arranged between a card insertion port and a card storage unit, the card inserted from the card insertion port is received into the card storage unit, and the card from/in which information has been read/written is discharged from the card insertion port or a card discharge port.

In the second embodiment, a card processing apparatus for performing a read/write process to, e.g., a prepaid IC card has been described. However, the present invention can be similarly applied to an IC card processing apparatus for reading information from an IC card serving as an ID card for identifying an individual.

As has been described above, in an IC card processing apparatus according to the second embodiment of the present invention, a card inserted from a card insertion port is guided to a card storage unit having an opening formed in the lower surface thereof, and a slide member brought into contact with the leading end of the card is slid backward to pivot a card pressing member. The inserted card is pressed from the lower surface onto contact terminals arranged at the upper portion of the card storage unit, thereby bringing the external terminals of the card into contact with the contact terminals, respectively.

For this reason, in the IC card processing apparatus according to the second embodiment of the present invention, a proper card can be certainly received to a terminal contact position without causing a force for forcibly bending the external terminal portion of the proper IC card to act on the proper IC card, and a card jam caused by inserting a wrong card shorter than the proper card can be prevented.

Additional embodiments of the present invention will be apparent to those skilled in the art from consideration of the specification and practice of the present invention disclosed herein. It is intended that the specification and examples be considered as exemplary only, with the true scope of the present invention being indicated by following claims.

What is claimed is:

1. An IC card processing apparatus, which is designed to receive an IC card having a predetermined size and external terminals on one surface of said IC card and has contact terminals, for bringing said external terminals into contact with said contact terminals to perform a read/write process, said apparatus comprising:

a slot having a card insertion port for receiving said IC card;

a frame, having an opening for, when a card-like foreign substance having a size smaller than the predetermined size is inserted from said card insertion port, discharging the card-like foreign substance, for receiving said IC card inserted from the card insertion port of said slot;

a movable member movably attached to said frame to be pressed and moved by said IC card inserted from said slot; and a card pressing member, engaged with said movable member and pivoted with movement of said movable member, for pressing the other surface of said IC card when said IC card is inserted to a predetermined position in said frame to bring said external terminals into contact with said contact terminals and to keep said IC card at the predetermined position.

2. An apparatus according to claim 1, wherein said contact terminals are attached to said frame.

3. An apparatus according to claim 1, wherein said contact terminals are attached to said movable member.

4. An apparatus according to claim 1, wherein said movable member is biased toward said slot by a biasing member toward said slot.

5. An apparatus according to claim 1, further comprising at least one projection for guiding said IC card inserted from said slot in a direction to separate said IC card from said contact terminals.

6. An apparatus according to claim 1, wherein said card pressing member engaged with said movable member comprises a cam portion having a parallel portion formed at one portion of said card pressing member.

7. An apparatus according to claim 1, wherein said movable member engaged with said card pressing member comprises an arc-like cam portion.

8. An apparatus according to claim 1, further comprising a shutter which is arranged behind said card insertion port of said slot to normally close said card insertion port of said slot, and is pivoted with insertion of said IC card to open said card insertion port of said slot.

* * * * *